United States Patent [19]

Handke

[11] Patent Number: 5,004,400

[45] Date of Patent: Apr. 2, 1991

[54] AUTOMATIC RATE MATCHING SYSTEM

[75] Inventor: Wayne A. Handke, Duncan, Okla.

[73] Assignee: Halliburton Company, Duncan, Okla.

[21] Appl. No.: 337,501

[22] Filed: Apr. 13, 1989

[51] Int. Cl.[5] ............................................ B65G 65/32
[52] U.S. Cl. ................................. 414/786; 222/56; 414/296; 414/294; 198/524
[58] Field of Search ............... 414/283, 284, 295, 296, 414/323, 325, 326, 327, 269, 270, 786, 271, 161, 289; 250/577, 222.1; 222/56, 57; 198/524; 73/861.04

[56] References Cited

U.S. PATENT DOCUMENTS

| | | | |
|---|---|---|---|
| 2,381,505 | 8/1945 | Lindholm | 414/296 X |
| 2,412,137 | 12/1946 | Fink | 414/294 |
| 2,430,407 | 11/1947 | Nelson | |
| 3,062,355 | 11/1962 | Sawada | |
| 3,133,726 | 5/1964 | Tarukawa | 414/296 X |
| 3,724,720 | 4/1973 | Bullivant | 222/55 |
| 3,935,970 | 2/1976 | Spaw | 222/56 |
| 4,035,635 | 7/1977 | Crosland et al. | 250/223 |
| 4,037,712 | 7/1977 | Wochnowski | 198/524 |
| 4,070,575 | 1/1978 | Park et al. | 250/223 |
| 4,096,424 | 6/1978 | Hysler | 318/480 |
| 4,169,543 | 10/1979 | Hall | 222/56 |
| 4,170,311 | 10/1979 | Spaw | 414/289 |
| 4,219,133 | 8/1980 | Sinsky | 222/39 |
| 4,372,439 | 2/1983 | Dempsey | 198/470 |
| 4,391,362 | 7/1983 | Spinelli | 198/855 |
| 4,512,200 | 4/1985 | Ghering et al. | 73/861.04 |
| 4,709,143 | 11/1987 | Henderson | 250/222.1 |
| 4,745,293 | 5/1988 | Christensen | 250/577 |
| 4,788,444 | 11/1988 | Williams | 250/577 |

FOREIGN PATENT DOCUMENTS

| | | | |
|---|---|---|---|
| 499246 | 11/1950 | Belgium | 414/296 |
| 2552 | 1/1980 | Japan | 198/524 |
| 23029 | 1/1986 | Japan | 222/56 |
| 897677 | 1/1982 | U.S.S.R. | 414/296 |
| 2030732 | 4/1980 | United Kingdom | 198/524 |

Primary Examiner—Frank E. Werner
Attorney, Agent, or Firm—James R. Duzan; Mark E. McBurney

[57] ABSTRACT

An automatic rate matching system is provided such that the delivery of bulk material is matched with the quantity of bulk material required by a process. An optical probe is used which determines the depth of material delivered into a hopper, prior to its retrieval for use in the process. The probe and associated electronic components output a signal to a CPU which then varies the speed of a belt conveyor based upon the depth of material. As the material depth decreases, belt speed is increased. Conversely, as material depth increases, belt speed is decreased. Therefore, the delivery rate of bulk material is matched to the quantity required in a process by varying the speed of the conveyor belt, based upon the depth of material in the hopper.

9 Claims, 7 Drawing Sheets

AUTOMATIC RATE MATCHING SYSTEM

BACKGROUND OF THE INVENTION

In the oil and gas industry it is often desirable to stimulate a hydrocarbon formation by hydraulically fracturing the formation. This fracturing occurs by pumping a slurry having a proppant, such as sand, bauxite, walnut shells, or the like down a well bore, through perforations therein and into the hydrocarbon producing formation. The proppant remains in the fracture after the fluid has been withdrawn, thus "propping" the fracture open, and enhancing production.

A proppant material moving system, such as a conveyor belt, is used to transfer the proppant (usually sand) from transport and storage containers, or the like to a blender wherein the proppant is mixed with a fluid to form the slurry to be pumped down the well. The present invention is an improved system for automatically matching the quantity of proppant being retreived from the storage containers with the quantity of proppant, required by the blender in order to maintain a desired sand concentration.

Presently, an operator must monitor the quantity of sand being conveyed along a belt, from the storage containers or hoppers, and manually regulate the size of the opening through which proppant feeds onto the belt. Generally, the belt speed is set at its maximum rate of travel and the material feed rate is varied.

U.S. Pat. No. 4,219,133 to Sinsky shows a storage level monitor which uses a weight lowered into a bin as a probe and correspondingly turns on, or shuts off a material feed conveyor. U.S. Pat. Nos. 4,170,311 and 3,935,970 to Spaw illustrate level measuring systems for grain which use a reactance probe to determine material level in a bin and turns on, or shuts off a delivery system based upon the material level. A variable speed delivery system is shown in U.S. Pat. No. 3,724,720 to Bullivant which varies the delivery of material when a constant amount of material is being utilized by a process.

SUMMARY OF THE INVENTION

In contrast to the prior art systems of matching the feed rate of particulate material with the requirement therefore, the present invention utilizes an optical probe which detects the level of sand which has been previously fed in to a hopper and is continuously being used in a blending process. Discrete electrical signals, based upon the detected sand level are input to a processsor which determines the appropriate belt speed to maintain a specified sand level, thus automatically matching the provided proppant with the quantity required. By operating the material feed conveyor at only the full on or full off positions, a great deal of equipment wear is induced due to abrupt changes in state of the apparatus. Conversely, the present invention incrementally increases, or decreases the delivery rate of the material thereby preventing the equipment wear which occurs when systems such as these in U.S. Pat. Nos. 4,219,133; 4,170,311; and 3,935,970 are used. Therefore, the rate matching system of the present invention varies belt speed rather than merely turning on, or shutting off the conveyor, while maintaining the material within a hopper at a constant level.

DETAILED DESCRIPTION OF THE PREFERRED EMBODIMENTS

Figure 2:
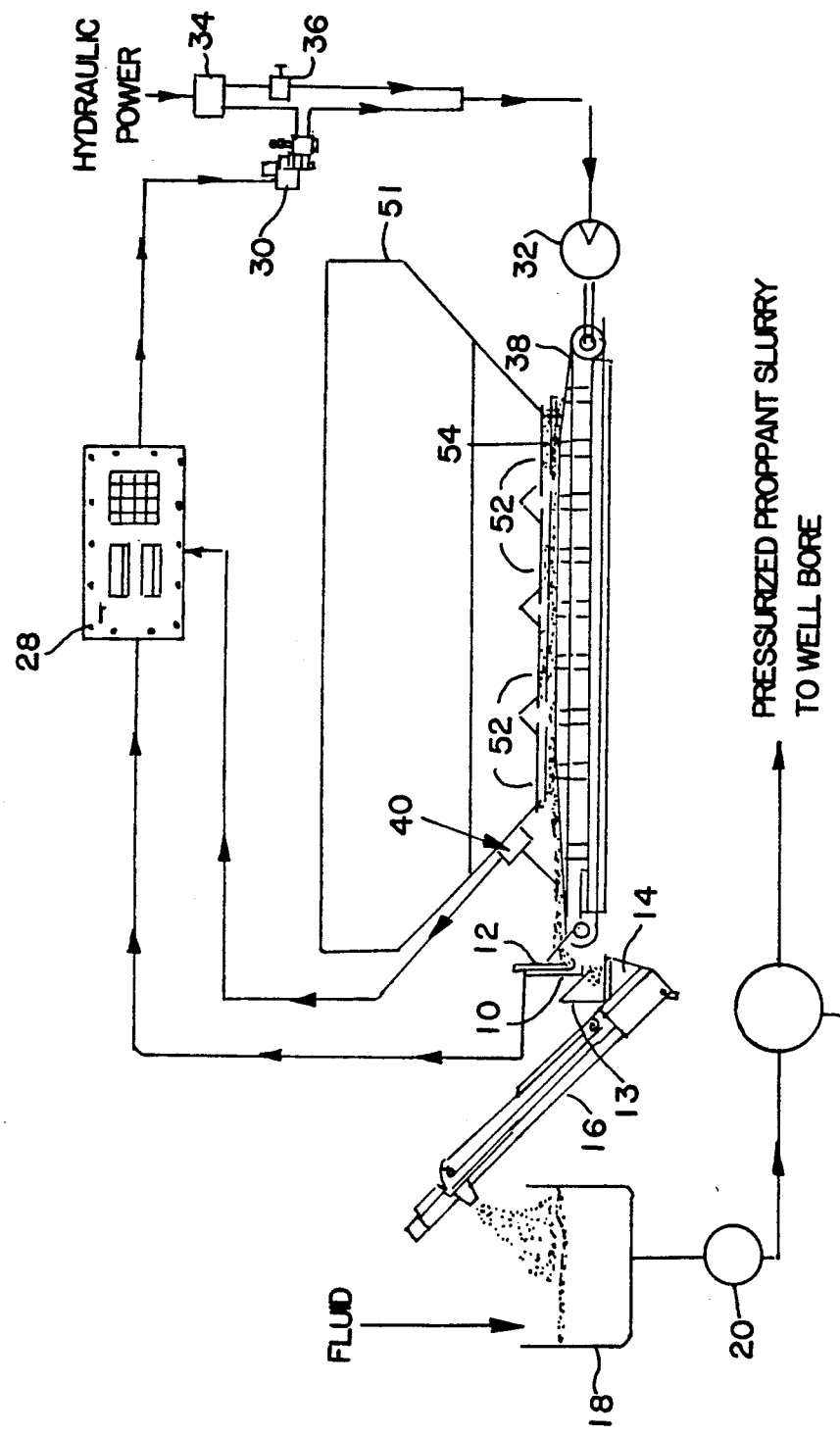
FIG. 2 schematically illustrates the overall rate matching system of the present invention.

Referring first to FIG. 2, the rate matching system of the present invention is schematically depicted. An optical probe 10 is shown and disposed in a hopper 14 which is below and proximate to a variable speed delivery belt 38, such as a conveyor belt. It should be noted that any type of probe capable of determining the level of material, such as capacitance and ulta-sonic probes, is contemplated by the present invention. However, an optical probe is preferred since it will give consistent readings regardless of the moisture content, angle of repose and temperature of the proppant material. The alternate probes mentioned above will give different readings which will vary in relation to moisture, temperature and angle of repose. Proppant metering screws 16 which are augers, or the like, are used to transfer material from hopper 14 to a blending tub 18 wherein fluid and proppant are mixed to form a slurry which is subsequently pumped down a well bore. The proppant slurry is drawn out of tub 18 by a centrifugal pump 20 and input to a positive displacement down hole pump 22 such as a Halliburton Services HT-400 Model triplex piston pump, or the like.

Optical probe 10 includes optical switch means 24 (FIG. 5), such as a photoresistor, or the like and a circuit card 25 including a summing circuit 26 and a comparator circuit. The summing circuit 26 outputs a proppant level signal to a driver circuit 29 which then outputs a signal to a microprocessor 28. A valve control signal, varying in accordance with the material level is then output by CPU 28 to an electrohydraulic valve 30. Microprocessor 28 may be any commercially available programmable central processing unit (CPU) or controller. The valve control signal is received by electrohydraulic valve 30, which then controls the hydraulic power to hydraulic motor 32. The hydraulic driving power is input, from an outside source, to a manual-/auto selector switch 34. Manual control valve 36 allows the automatic rate matching system of the present invention to be bypassed such that hydraulic power can be directly supplied to motor 32. Normally, the amount of hydraulic power provided to motor 32 will be regulated by electrohydraulic valve 30 (based upon the received valve control signal) and the speed of the conveyor belt 38, mechanically coupled thereto will be controlled according to the level of proppant in hopper 14. It should be noted that as the speed of conveyor 38 increases the proppant material is thrown outwardly, thereby unevenly distributing the sand in hopper 14. To compensate, a deflector shield 13, which is horizontally adjustable towards and away from conveyor 38, is provided such that the distribution of sand collected in hopper 14 is controllable. A storage container, or bin 51 includes a plurality of chutes 52 with hydraulically operable doors 54 thereon. As can readily be seen, once doors 54 are open and maintained at a predetermined position the sand is allowed to flow onto belt 38 and the quantity of proppant delivered will be regulated by varying the speed of motor 32.

Additionally, a proppant detection switch 40 provides a signal to processor 28 indicating the presence, or absence of sand on belt 38. If sand is present on belt 38, then the rate matching system operates under normal conditions. However if there is no sand on belt 38, then the processor 28 will hold the corresponding belt speed at its previous level, or increase speed by a predetermined percentage and then hold the speed belt of 38 constant. The control process utilized by the present invention will be more fully discussed with reference to FIGS. 5, 6 and 7.

Optical probe 10 will now be more fully described with reference to FIG. 1. Enclosure 42 is fabricated from a sturdy, moisture resistant material such as plastic, or epoxy. The photoresistors 24 are linearly disposed within enclosure 42 which is disposed vertically within hopper 14 (FIG. 2). Photoresistors 24 may be of any commercially available types which vary electrical resistance based upon the amount of radiant light received. Electrical leads 44 connect the plurality of photoresistors 24 with circuit card 25 which includes the comparator circuit 27, summing circuit 26 and driver circuit 29. Electrical cable 46 then outputs the level signal to processor 28.

Figure 1:
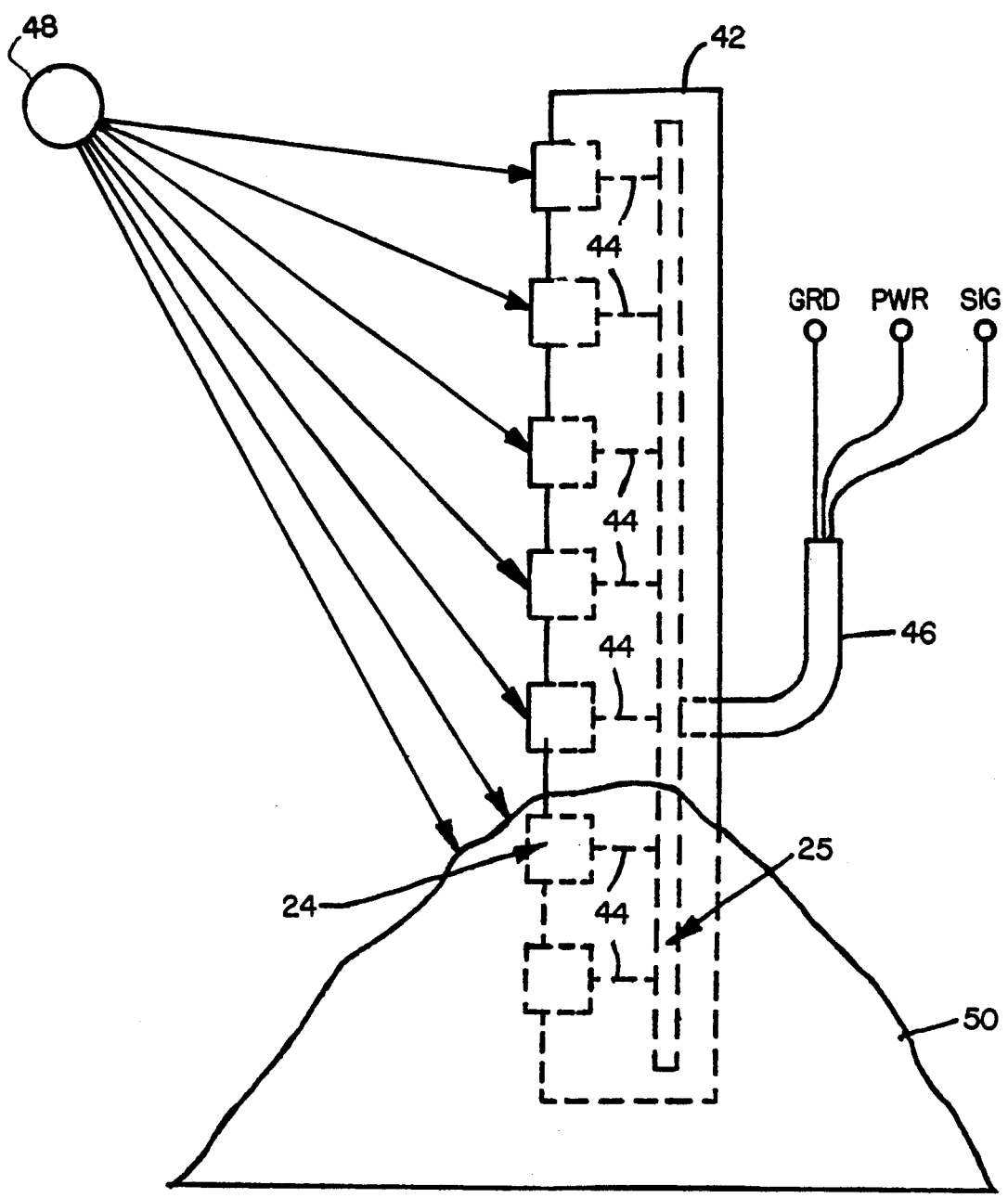
FIG. 1 is a schematic diagram showing the optical probe of the rate matching system of the present invention.

As can readily be seen from FIG. 1, a light source 48 emits radiant energy which contacts photoresistors 24, except where the proppant has accumulated and blocked passage of the radiant energy therethrough. That is, a sand pile 50 accumulates in hopper 14 and increases when conveyor belt 38 provides sand at a rate faster than the proppant is retrieved by metering screws 16. Conversely, the height of sand pile 50 decreases, thus exposing more photoresistors 24 to light source 48 as metering screws 16 retrieve more proppant than is provided by belt 38.

Therefore, it can readily be seen that as sand pile 50 decreases, the speed of conveyor belt 38 must be increased to supply a quantity of sand equal to the requirements of screw 16. Similarly, as sand pile 50 increases, the speed of conveyor belt 38 must be decreased to allow metering screw 16 to "catch up" and transfer the proppant previously delivered by belt 38 such that a desired level of sand pile height can be maintained.

It should be noted that the light source 48 may include direct sunlight, the sunlight which penetrates cloud cover or an artificial light source such as an incandescent or flourescent light bulb. Consequently, the rate matching system of the present invention will operate on cloudy or cloudless days and at night if an artificial light source is used. Those skilled in the art will appreciate that many types of artificial lighting, such as an incandescent car headlight which can be connected to a 12 or 24 volt DC power source, or the like can be utilized.

A first embodiment of the present invention, which represents one of the configurations contemplated, will now be described with reference to FIG. 3. Variable speed conveyor belt 38 delivers material, in this case proppant, to hopper 14. Proppant detection switch 40 includes an arm which is mechanically connected to an electrical switch. The arm position varies in response to the presence, or absence, of material on belt 38. If no material is present, then the electrical switch sends a signal to CPU 28 which then holds the belt speed at its current level.

Metering screws 16 supply the proppant material to tub 18 from hopper 14. Optical probe 10 is vertically inserted into hopper 14 and held therein by a bracket 12 (FIG. 2) which includes a plurality of vertically aligned holes such that probe 10 can be bolted thereto and vertically adjusted in with respect to hopper 14. In this embodiment the delivery rate of belt 38 is matched with the retrieval rate of metering screws 16. Thus the present invention using optical probe 10, in conjunction with CPU 28, determines the appropriate speed of belt 38 by looking at the requirements of screws 16 and the quantity of material delivered.

Figure 3:
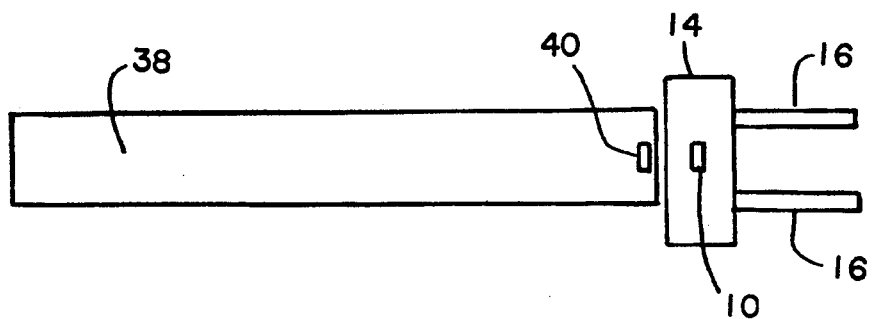
FIG. 3 is a plan view of a first configuration of a proppant delivery system contemplated by the present invention.
Figure 4:
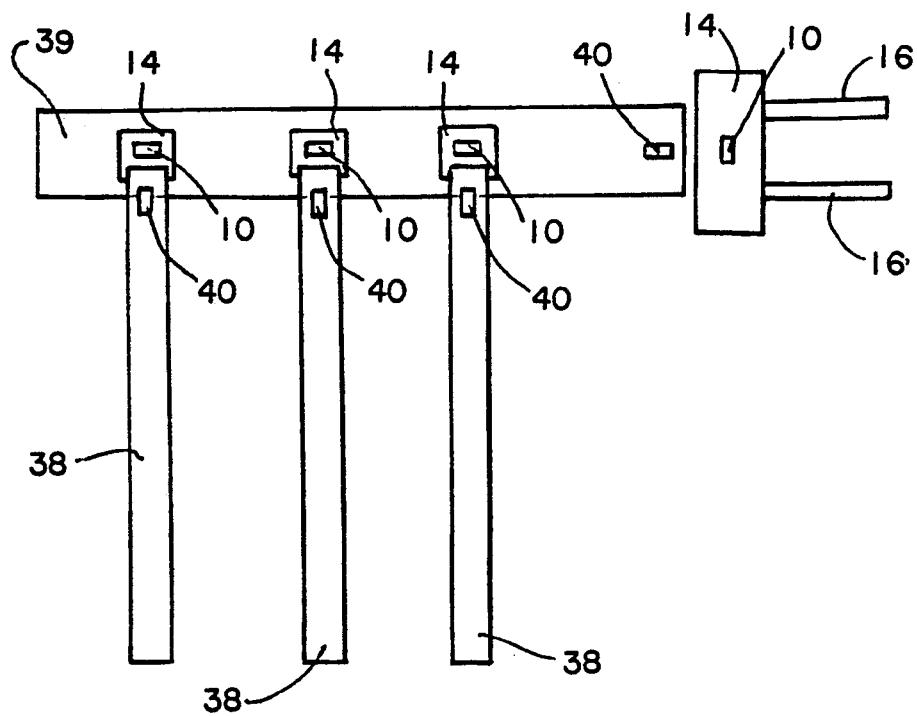
FIG. 4 is a plan view of another proppant, or material delivery system which utilizes the automatic rate matching system.

The configuration of FIG. 4 represents a larger fracturing operation than that illustrated by FIG. 3. A variable speed gathering conveyor belt 39 is utilized in this embodiment. A plurality of conveyor belts 38 feed into corresponding hoppers 14, which in turn discharge the proppant material onto gathering belt 39.

Each of belts 38 and gathering conveyor 39 have a proppant detection switch 40 and optical probe 10 associated therewith. Each of the proppant detection switches 40 provide the same function, i.e. hold current speed when no material is present, for their respective belts as described above. Likewise, each of optical probes 10 compare the quantity of material delivered by its associated belt with the quantity of material retrieved. For example, a probe 10 looks at the amount of material retrieved by metering screws 16 with respect to the quantity delivered by belt 39. Similarly, each of the remaining probes 10 compare the amount of material retrieved by gathering belt 39 in relation to the quantity a delivered by their associated belts 38.

It should be noted that each of the probes 10 and its associated CPU 28 use an identical process to determine the relationship between the quantity of proppant being delivered and the amount required (i.e. desired belt speed). This control process will be described below in conjunction with FIGS. 6a and 6b.

In light of the above, it can be understood how a virtually unlimited number of configurations of delivery belts 38, gathering belts 39 and optical probes 10 can be used to match a quantity of material being delivered, to the quantity of material required for a specific process, regardless of the number of delivery conveyors 38 providing material. Additionally, the present invention contemplates using a plurality of gathering conveyors 39, each having a number of delivery conveyors 38 associated therewith.

Further, it can be seen how a cascade effect is created whereby the total quantity of material delivered is regulated by the requirements of screws 16, the speed of gathering belt 39 and the material delivered by each successive delivery belts(s) 38 and any other utilized gathering belt 39/delivery belt 38 combinations. Each optical probe 10 regulates the quantity delivered based upon the requirements at its particular physical location. Thus, the present invention provides the total requirements of screws 16 through a series of interconnected delivery systems.

Figure 5:
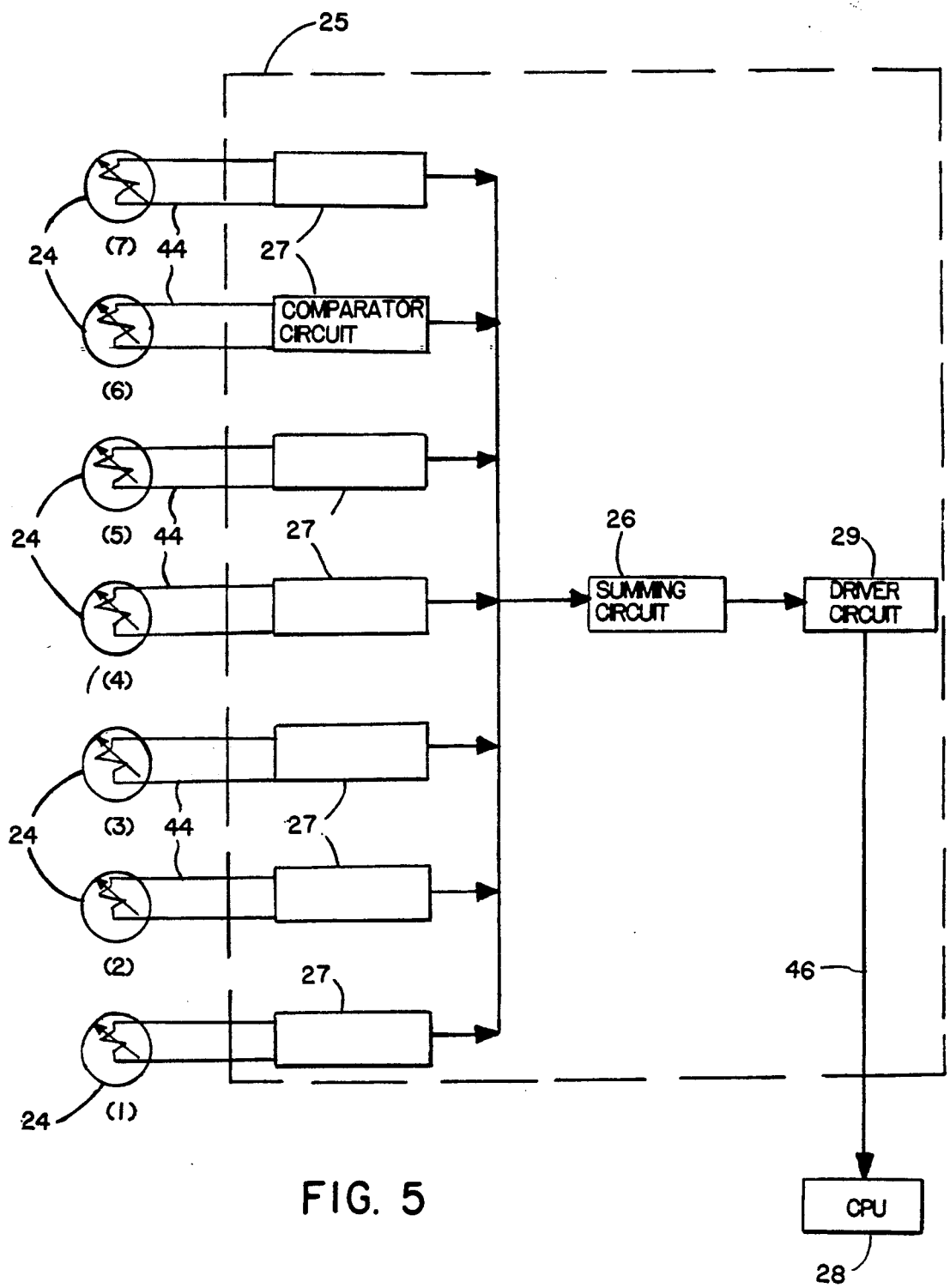
FIG. 5 is a block diagram illustrating the various components of the present invention which are used to determine the material level.

FIG. 5 is a block diagram which shows a plurality of photoresistors 24 (in this case seven) each of which presents a resistance varying from, for example, 100 ohms to 10,000 ohms, when the photoresistor 24 is illuminated, or covered, respectively. Of course, other types of photoresistors are available which would provide different resistance ranges and these alternate photoresistors are contemplated by the present invention. Each photoresistor 24 has an associated comparator circuit 27 which determines whether the photoresistor 24 is covered with sand, or not, by checking the resistance therein. This is accomplished by using a voltage divider type circuit or the like, which is well known in the art. Each comparator circuit 27 then amplifies and outputs the signal indicating the status of its associated photoresistor 24. Summing circuit 26 receives the signals from the comparator circuits 27 and adds these signals, thus providing a signal representative of the number of photoresistors 24 which are covered by sand pile 50. This summed signal is then output to a driver circuit 29 which modifies the summed signal into a form compatible with CPU 28. For example, the signal from summing circuit 26 may be a voltage signal, in which case driver circuit 29 would amplify and modify the signal from summing circuit 26 into a 0 to 5 volt dc signal to be read by CPU 28. Similarly, the signal from summing circuit 26 may be converted to a 4 to 20 milliamp current signal prior to being input to CPU 28. In both instances the magnitude of the signal being input to CPU 28 proportionally represents the number photoresistors 24 covered by sand pile 50.

Consequently, a 20 mA, or 5 vdc signal input to CPU 28 may indicate that all photoresistors 25 are covered, in which case, a 4 mA, or 0 vdc signal indicates that all photoresistors 24 are illuminated. It then follows how a 10 mA, 2 vdc signal may indicate that 3 of the 7 photoresistors 24 are covered.

Each of the photoressotors 24 depicted in FIG. 5 have been assigned a switch number 1 through 7 which is then used by CPU 28 to detect the level of sand pile 50. The status of those switches (closed when covered and open when illuminated) at a given time allows CPU 28 to determine what type of action needs to be taken, i.e. increase, or decrease delivery rate.

Figure 6A:
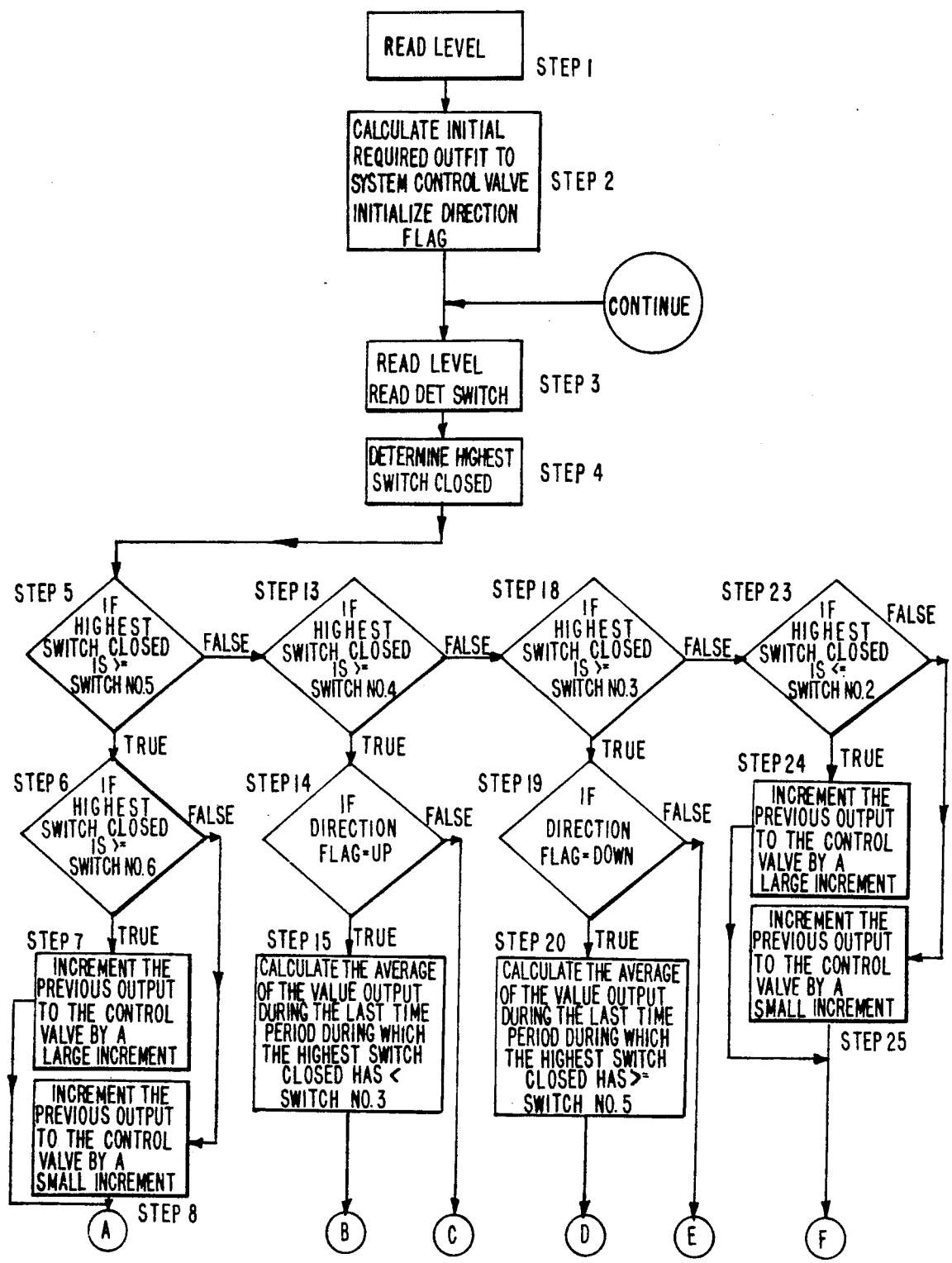
FIGS. 6a and 6b are flow charts which represent the control process utilized by a central processing unit (CPU) to maintain a specified sand level.
Figure 6B:
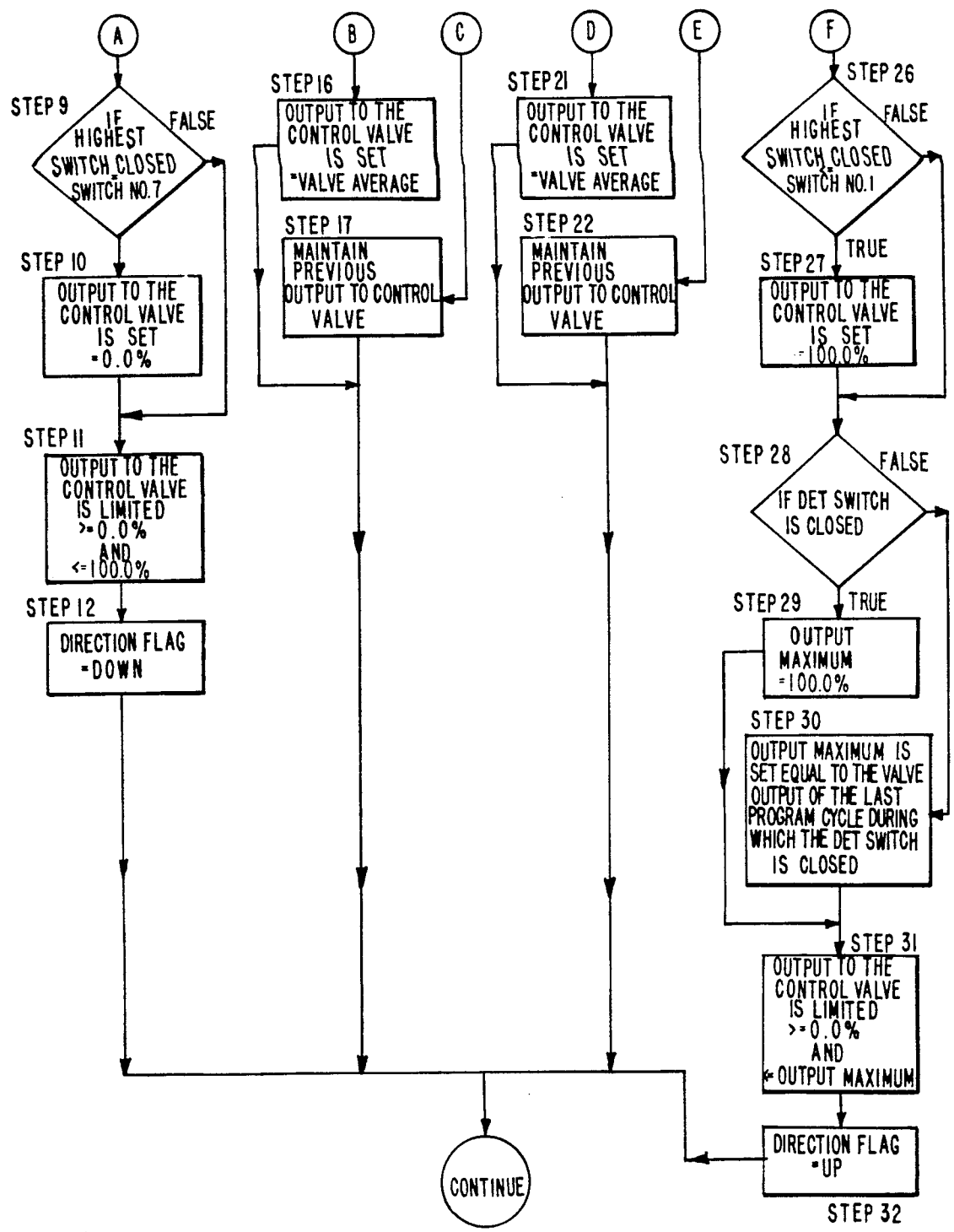

The control process utilized by CPU 28 to determine the delivery rate of material such that a desired level of sand pile 50 is maintained on probe 10 will now be described with reference to the flow chart depicted in FIGS. 6a and 6b.

At step 1, the level of sand pile 50 is read by CPU 28. This level depends upon the states of switches 1 through 7, i.e. which ones are covered. Step 2 calculates an initial output signal to electro-hydraulic valve 30 and initializes a direction flag.

The present invention is based upon percentages of the maximum delivery rate of conveyor 38, which is considered 100 percent. Therefore, if an initial delivery rate of 50 percent is calculated, conveyor 38 is operating at one-half of its maximum rate. The initialization of the direction flag provides the system with a reference as to whether the proppant level is increasing or decreasing.

The system then rereads the proppant level and the proppant detection switch, at step 3. The highest switch which is closed (covered) is the determined at step 4. It should be noted that the control system assumes that if any switches are closed, it must be the lower ones due to the fact that sand pile 50 in influenced by gravity and collects at the bottom of hopper 14.

Figure 7:
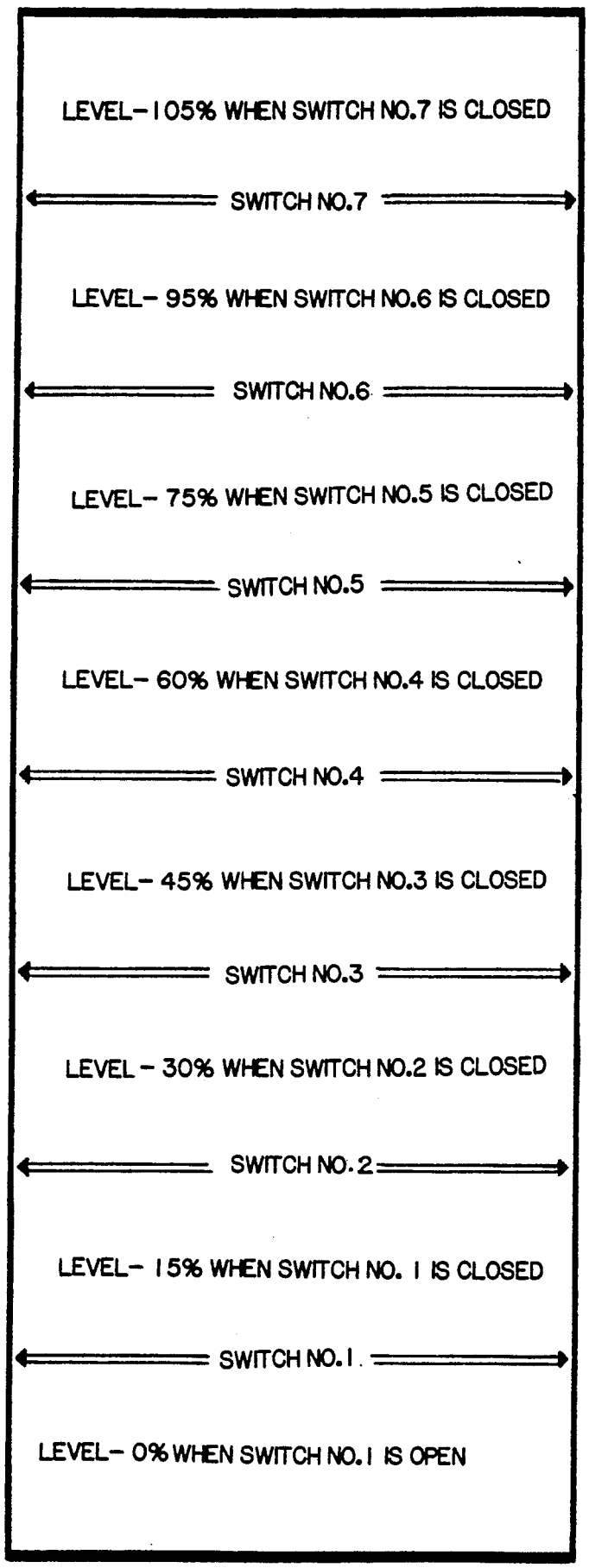
FIG. 7 is a chart showing the discrete points which are used by the CPU during the operation of the automatic rate matching system of the present invention.

Step 5 the system checks it the highest switch closed is greater than or equal to number 5 (see FIGS. 5 and 7). If so, then the system proceeds to step 6 which looks at it the highest switch closed is greater than or equal to switch 6. If true, then at step 7 the initial delivery rate calculated at step 2 is decreased by a large decrement. The amount of decrement utilized is dependent upon the desired reaction time of the system. Typically a large decrement of two (2) percent of the maximum delivery rate will be used, and one (1) percent is considered a small decrement.

But, if the highest closed switch is not switch 6 then the system continues to step 8 where the previous output is decremented by a small decrement. Step 9 determines if the highest switch closed is greater than or equal to switch 7. If true, then the output to control valve 30 is set to zero (0) percent at step 10, i.e. conveyor 38 is turned off. If not, then step 11 limits the control output to the range of from 0 to 100 percent. The limitation feature prevents the system from increasing or decreasing itself without bound i.e. the system could continue to add large increments until the output to the control valve exceeded 100 percent. Similarly, continues decrements could cause the output to the control valve to be less than zero, i.e. a lag time would occur while the system incremented until the output was greater than zero. Step 12 then sets the direction flag to the down, or decreasing direction, and the system returns to step 3.

If at step 5, the highest switch closed was not greater than or equal to number 5 then step 13 checks to see if the highest switch closed is greater than or equal to number 4. If true, then the system checks, at step 14, to see if the direction flag is up (increasing level). If the direction flag is up, then step 15 calculates the average of the outputs to the control valve 30 during the period in which the highest switch closed was number 3. Next, step 16 outputs the previously calculated average to control valve 30, after which the system returns to step 3. If, at step 14, the direction flag is not in the up position then the subprogram advances to step 17 and the previous output to the control valve is maintained after which the system returns to step 3.

If at step 13 the highest switch closed is not greater than or equal to switch number 4 then the system determines at step 18 whether the highest switch closed is greater than or equal to switch number 3. If so, then the system proceeds to step 19 looks at whether the direction flag is down (decreasing level), or not. If true, then, at step 20, the average value of the output to control valve 30 is calculated for the period during which the highest switch closed was greater than or equal to number 5. Step 21 outputs the previously calculated average value to the control valve and then returns to step 3. However, if at step 19 the flag direction is not down, then the program proceeds to step 22 which maintains the previous output to control valve 30 and then returns to step 3.

If at step 18, the highest switch closed is not greater than or equal to switch number 3, then step 23 determines if the highest switch closed is less than or equal to switch number 2. If true then step 24 increments the previous output to control valve 30 by a large increment. If, the highest switch closed is not less than or equal to switch number 2 then step 25 increments the previous output by a small increment. Next, step 26 determines if the highest switch closed is less than switch number 1. If true then the output to control valve 30 is set to its maximum delivery rate at step 27 (i.e. 100 percent). If, it is determined that the highest switch closed is not less than or equal to number 1, then the system proceeds to step 28 which checks whether the proppant detection switch is closed (i.e. proppant material is present on conveyor 38). If the detection switch is closed, then at step 29 the maximum output to the control valve is limited to 100 percent. But, if it is determined at step 28 that the detection switch is not closed then step 30 sets the output maximum for the control valve equal to the valve output during the last program cycle during which the detection switch was closed. Next, step 31 actually limits the control valve output in the output range between zero and the output maximum previously determined in steps 28, 29 and 30. Step 31 provides a limit for the same reasons as described previously in conjunction with step 11. Step 32 sets the direction flag to the up, or increasing position and then returns to step 3.

Thus, from the foregoing it can readily be seen how the present invention controls the material delivery rate based upon whether switches one through seven are covered. It can also be seen how this delivery rate is independent of the amount of material required by the particular process, in this case a blending operation.

FIG. 7 is a chart which illustrates the percentages used by CPU 28 to determine the number of switches closed (covered). For example, if the level signal input to CPU 28 is at 100 percent (or above) of its maximum, then the system knows that all seven switches are closed. Whereas, if the signal is at 30 percent of maximum then the system reacts as if the bottom two switches (numbers 1 and 2) are covered.

The present invention has been described using photoresistor type switches, however it should be noted that the control process utilized by CPU 28 is applicable regardless of what type switch is used. Further, any suitable type of probe means can be used as long as any continous probes are divided into ranges such as those illustrated in FIG. 7.

Although certain preferred embodiments have been shown and described, it should be noted that many changes and modifications may be made therein without departing from the scope of the appended claims.

What is claimed is:

1. A method of controlling the delivery of bulk material into a vessel from which delivered bulk material moves, comprising steps of:
   (a) generating a control signal for controlling the speed of a means for delivering bulk material to the vessel at an adjustable rate between a minimum rate and a maximum rate;
   (b) designating a direction of change in the level of bulk material in the vessel;
   (c) generating, in response to the level of bulk material in the vessel, output signals from a plurality of sensors disposed in the vessel;
   (d) determining, in response to the output signals, the highest sensor detecting the presence of bulk material in the vessel; and
   (e) controlling the control signal in response to the highest sensor determined to be detecting the presence of bulk material in the vessel, including:
      (i) in response to said highest sensor being above a mid-range of the sensors, changing the control signal so that the speed of the means for delivering is decreased a predetermined amount;
      (ii) in response to said highest sensor being within an upper region of the mid-range of the sensors, changing the control signal to a calculated average control signal in response to a designated increasing level of bulk material in the vessel and maintaining the control signal as is in response to a designated decreasing level of bulk material in the vessel;
      (iii) in response to said highest sensor being within a lower region of the mid-range of the sensors, changing the control signal to a calculated average control signal in response to a designated decreasing level of bulk material in the vessel and maintaining the control signal as is in response to a designated increasing level of bulk material in the vessel; and
      (iv) in response to said highest sensor being below the mid-range of the sensors, changing the control signal so that the speed of the means for delivering is increased a predetermined amount.

2. A method as defined in claim 1, wherein said step (b) includes designating a decreasing level of bulk material in response to said step (e)(i), and designating an increasing level of bulk material in response to said step (e)(iv).

3. A method as defined in claim 1, wherein said steps (e)(i) and (e)(iv) each further includes limiting the control signal to a magnitude which does not exceed the magnitude needed for the minimum rate or maximum rate of the means for delivering.

4. A method as defined in claim 1, wherein said step (e)(iv) further includes:
   detecting whether bulk material is being delivered by the means for delivering;
   in response to bulk material being delivered, changing the control signal so that the speed of the means for delivering is at the maximum rate; and
   in response to bulk material not being delivered, changing the control signal so that the speed of the means for delivering is the same as the speed during the last period during which bulk material was being delivered.

5. A method of controlling the delivery of bulk material into a vessel from which delivered bulk material moves, comprising steps of:
   (a) generating a control signal for controlling the speed of a means for delivering bulk material to the vessel at an adjustable rate;
   (b) designating a direction of change in the level of bulk material in the vessel;
   (c) generating, in response to the level of bulk material in the vessel, output signals from seven sensors spaced vertically in the vessel so that a first sensor is the lowest and a seventh sensor is the highest of said seven sensors with the remaining second through sixth sensors being disposed in numerical order therebetween;
   (d) determining, in response to the output signals, the highest sensor detecting the presence of bulk material in the vessel; and
   (e) controlling the control signal in response to the highest sensor determined to be detecting the presence of bulk material in the vessel, including:
      (i) in response to said determined highest sensor being the seventh sensor, changing the control signal so that the means for delivery is stopped;

(ii) in response to said determined highest sensor being the sixth sensor, changing the control signal so that the speed of the means for delivering is decreased by a first predetermined decrement;

(iii) in response to said determined highest sensor being the fifth sensor, changing the control signal so that the speed of the means for delivering is decreased by a second predetermined decrement, the second predetermined decrement smaller than the first predetermined decrement;

(iv) in response to said determined highest sensor being the fourth sensor, changing the control signal to an average control signal in response to the direction of change in the level of bulk material in the vessel being designated as increasing and maintaining the control signal as is in response to the directions of change in the level of bulk material in the vessel being designated as decreasing;

(v) in response to said determined highest sensor being the third sensor, changing the control signal to an average control signal in response to the direction of change in the level of bulk material in the vessel being designated as decreasing and maintaining the control signal as is in response to the direction of change in the level of bulk material in the vessel being designated as increasing;

(vi) in response to said determined highest sensor being the second sensor, changing the control signal so that the speed of the means for delivering is increased by a predetermined increment; and (vii) in response to said determined highest sensor being the first sensor, changing the control signal so that the speed of the means for delivering is at a maximum.

6. A method as defined in claim 5, wherein said step (b) includes designating a decreasing direction of change in response to each of said steps (e)(i), (e)(ii) and (e)(iii), and designating an increasing direction of change in response to each of said steps (e)(vi) and (e)(vii).

7. A method as defined in claim 5, further comprising limiting the changed control signal of said steps (e)(i), (e)(ii), (e)(iii), (e)(vi) and (e)(vii) to a magnitude which does not exceed the magnitude needed to stop the means for delivering or to drive the means for delivering at the maximum.

8. A method as defined in claim 5, further comprising, in response to either of said steps (e)(vi) and (e)(vii):

detecting whether bulk material is being delivered by the means for delivering;

in response to bulk material being delivered, changing the control signal so that the sped of the means for delivering is at the maximum; and in response to bulk material not being delivered, changing the control signal so that the speed of the means for delivering is the same as the speed during the last period during which bulk material was being delivered.

9. A method as defined in claim 5, wherein:

changing the control signal to an average control signal of said step (e)(iv) includes calculating the average of the control signal for the last time period during which said determined highest sensor was less that the third sensor and setting the control signal equal to said average calculated for said step (e)(iv); and changing the control signal to an average control signal of said step (e)(v) includes calculating the average of the control signal during the last time period during which said determined highest sensor was at least the fifth sensor and setting the control signal equal to said average calculated for said step (e)(v).

* * * * *